US009906459B2

(12) United States Patent
Smith et al.

(10) Patent No.: US 9,906,459 B2
(45) Date of Patent: Feb. 27, 2018

(54) SOCKET STATE TRANSFER

(71) Applicant: Hewlett Packard Enterprise Development LP, Houston, TX (US)

(72) Inventors: David E. Smith, Palo Alto, CA (US); Sabu Nadarajan, Palo Alto, CA (US); Chris R. Jones, Palo Alto, CA (US); Thomas J. Kondo, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 114 days.

(21) Appl. No.: 14/440,214

(22) PCT Filed: Jan. 27, 2013

(86) PCT No.: PCT/US2013/023338
§ 371 (c)(1),
(2) Date: May 1, 2015

(87) PCT Pub. No.: WO2014/116240
PCT Pub. Date: Jul. 31, 2014

(65) Prior Publication Data
US 2015/0288612 A1 Oct. 8, 2015

(51) Int. Cl.
*H04L 12/863* (2013.01)
*H04L 29/06* (2006.01)
(Continued)

(52) U.S. Cl.
CPC .......... *H04L 47/622* (2013.01); *H04L 47/125* (2013.01); *H04L 67/148* (2013.01); *H04L 69/16* (2013.01)

(58) Field of Classification Search
CPC ..... H04L 69/16; H04L 47/622; H04L 47/125; H04L 67/148
See application file for complete search history.

(56) References Cited

U.S. PATENT DOCUMENTS 7,251,745 B2   7/2007  Koch
7,627,001 B2  12/2009  Craft et al.
(Continued)

FOREIGN PATENT DOCUMENTS

CN       1921369      2/2007
CN     101690136      3/2010
(Continued)

OTHER PUBLICATIONS

International Searching Authority, The International Search Report and the Written Opinion, dated Jan. 23, 2014, 10 Pages.
(Continued)

*Primary Examiner* — Jae Y Lee
(74) *Attorney, Agent, or Firm* — Clifton L. Anderson

(57) ABSTRACT

In response to receiving TCP inbound message packets from a remote node, a network node buffers the received TCP message packets in a receive queue. The network node forwards the inbound message packets to an application node. Socket states, excluding receive-queue contents, are sent to a backup node. In response to receiving acknowledgements corresponding to respective inbound message packets from the application node, the network node sends respective acknowledgements from the network node to the remote node.

18 Claims, 3 Drawing Sheets

(51) Int. Cl.
*H04L 29/08* (2006.01)
*H04L 12/803* (2013.01)

(56) References Cited

U.S. PATENT DOCUMENTS

| | | | |
|---|---|---|---|
| 7,801,135 B2 | 9/2010 | Appanna | |
| 8,489,670 B1 * | 7/2013 | Fletcher | H04L 69/16 709/203 |
| 2003/0115357 A1 | 6/2003 | Chu | |
| 2005/0086342 A1 | 4/2005 | Burt et al. | |
| 2007/0014231 A1 | 1/2007 | Sivakumar et al. | |
| 2009/0157882 A1 | 6/2009 | Kashyap | |
| 2010/0029275 A1 | 2/2010 | Bosch et al. | |
| 2011/0270908 A1 | 11/2011 | Kern et al. | |
| 2012/0042034 A1 | 2/2012 | Goggin et al. | |
| 2012/0278804 A1 | 11/2012 | Narayanasamy et al. | |

FOREIGN PATENT DOCUMENTS

| | | |
|---|---|---|
| CN | 102035687 | 4/2011 |
| CN | 102742223 | 10/2012 |

OTHER PUBLICATIONS

Lorenzo Alvisi et al, Wrapping Server-Side TCP to Mask Connection Failures, Retrieved Apr. 20, 2015, 9 Pages.
Noel Burton-Krahn, HotSwap—Transparent Server Failover for Linux, USENIX Association Proceedings of LISA 2002: 16th Systems Administration Conference, Nov. 3-8, 2002, 9 Pages.
Ronghua Zhang, Efficient TCP Connection Failover in Web Server Clusters, IEEE Infooom 2004, Retrieved Apr. 15, 2015, 10 Pages.
Virtual Machine Live Migration Overview http://technet.microsoft.com/en-us/library/hh831435.aspx, Jul. 18, 2012, 4 Pages.
Werner Almesberger, TCP Connection Passing, Retrieved Apr. 15, 2015, 14 Pages.
Zhang, J. et al., intelligent Roaming for Nomadic Computing, (Research Paper), 3rd International Conference on Information and Communication Technologies: From Theory to Applications, Apr. 7-11, 2008, 6 Pages.
Marwah, M. et al, "TCP Server Fault Tolerance Using Connection Migration to a Backup Server", Proceedings of the 2003 International Conference on Dependable Systems and Networks, 0-7695-1959-8/03, Computer Society, 2003, 10 pages.

* cited by examiner

SOCKET STATE TRANSFER

BACKGROUND

Applications can communicate with each other using Transmission Control Protocol (TCP), e.g., TCP/IP (Internet Protocol) connections. For example, a remote application node (on which a source application sending a message packet is executing) can send a message packet to a remote network node, which sends the message to a local network node, which forwards the message packet to a local application node (on which the destination application is executing). The network nodes establish a connection to be used to communicate messages back and forth between application nodes. Each network node manages the state of its own "socket" i.e., endpoint, of the connection.

At times, it may be desirable to transfer a socket state to a different network node. For example, an application may be migrated, e.g., to a more capable or compatible host system, to rebalance workloads among host systems, to free a host system for maintenance or repair, or in response to a failure of some or all of the host system. "Migrating" herein includes fail-overs, which may involve making a backup copy of a workload or TCP connection socket during normal operation so that it is available if a failure precludes access to the original. To maintain uninterrupted operation, e.g., for mission-critical applications, it may be desirable to migrate an application's TCP socket(s) along with the application. There are also situations that call for transferring a socket but not an application, for example, to rebalance connection-based workloads among application instances.

BRIEF DESCRIPTION OF THE DRAWINGS

The following figures represent examples and no he invention itself.

DETAILED DESCRIPTION

Migrating a TCP connection involves transferring a socket (i.e., an endpoint) of a connection from a migration-source network node to a migration-target network node. A connection is a channel for inter-process communications flow across a network. A TCP socket can have a socket address that is a combination of a network destination address and a TCP port number. Internet sockets deliver messages to the correct application based on the socket address.

Each network node maintains a socket state for each connection. The socket state for a connection can include the connection's identity, TCP state, negotiated parameters, sequence numbers, window sizes, and socket options. The socket state can also include the contents of queues including: 1) a "receive queue" buffers message packets received from a remote network node that have not yet been acknowledged by a local application node; and 2) a "send queue" buffers message packets received from the local application node to be sent to but that have not yet been acknowledged by the remote network node.

Typically, the amount of data associated with the queue contents call far exceed the amount (about 160 bytes) associated with the rest of the socket state data. The amount of queue contents is particularly problematic when the socket state must be continually checkpointed to a standby network node in preparation for a fail-over so that all message packets and all acknowledgements of message packets associated with a socket are copied to the backup node. This can impose a considerable processing and communications bandwidth burden on the local/source network node, on the backup node, and on the network connecting the local/source and backup nodes. Examples herein improve network performance by reducing the processing and bandwidth burdens associated with transferring copies of TCP queue contexts.

Figure 1:
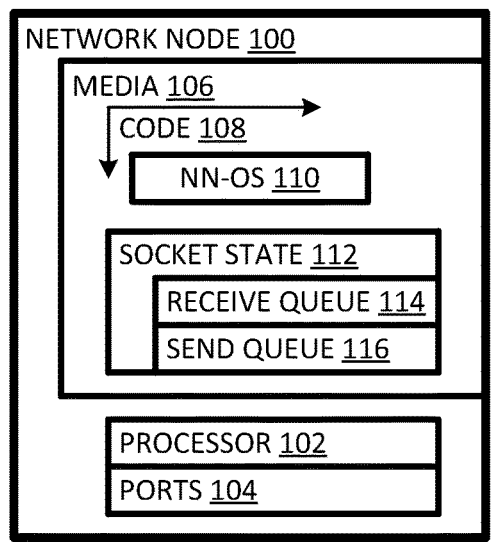
FIG. 1 is a schematic diagram of a system in accordance with an example.
Figure 2:
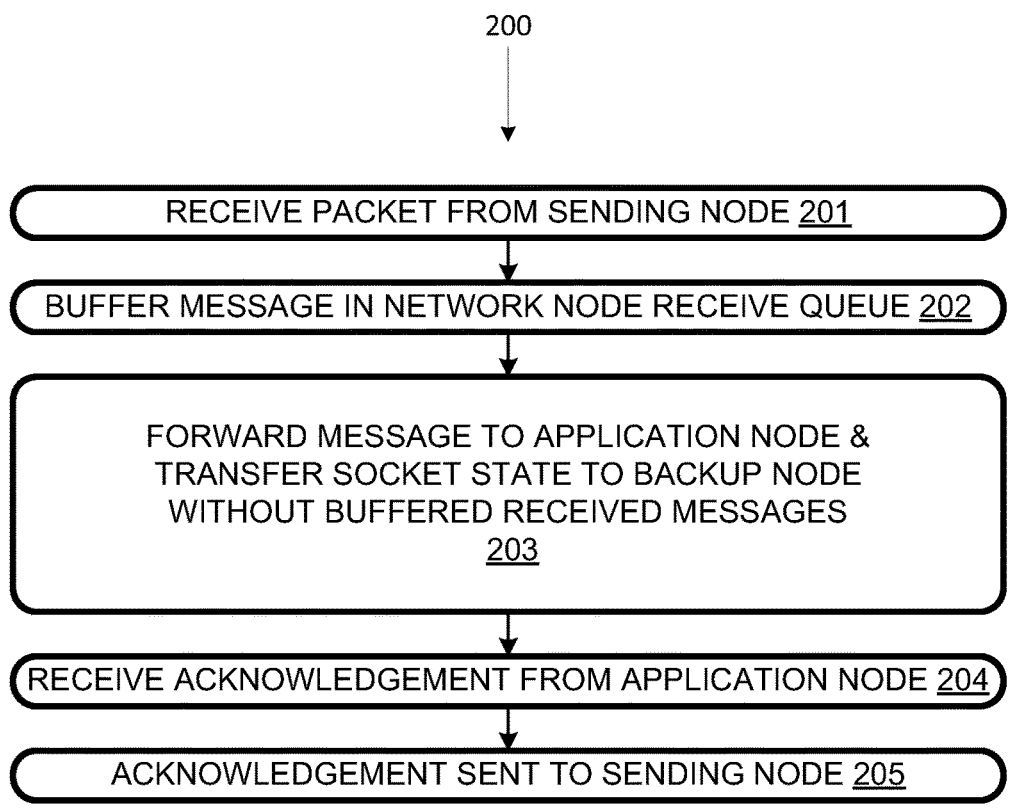
FIG. 2 is a flow chart of a process implementable by the system of FIG. 1 in accordance with an example.
Figure 3:
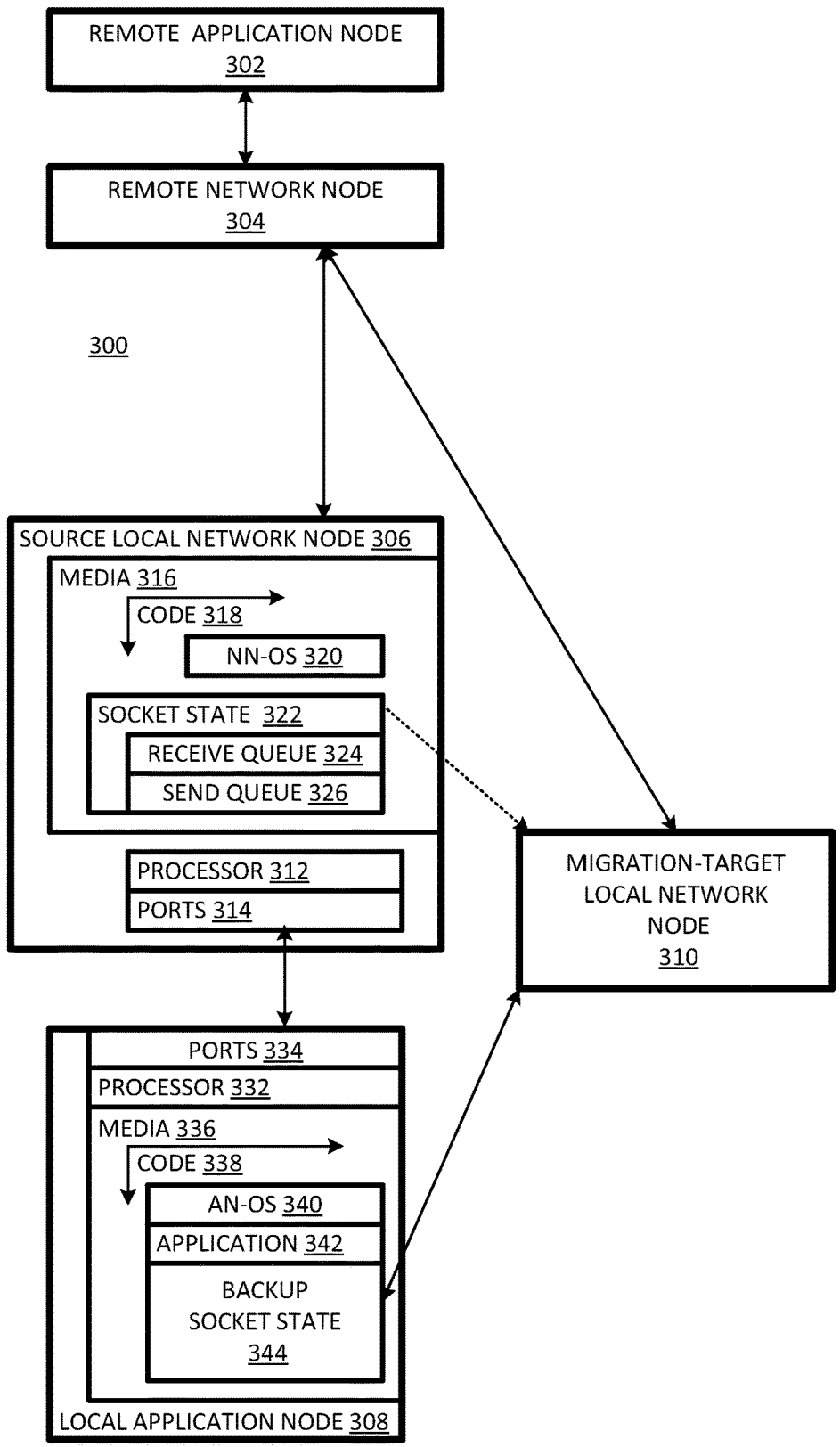
FIG. 3 is a schematic diagram of another system in accordance with an example.
Figure 4:
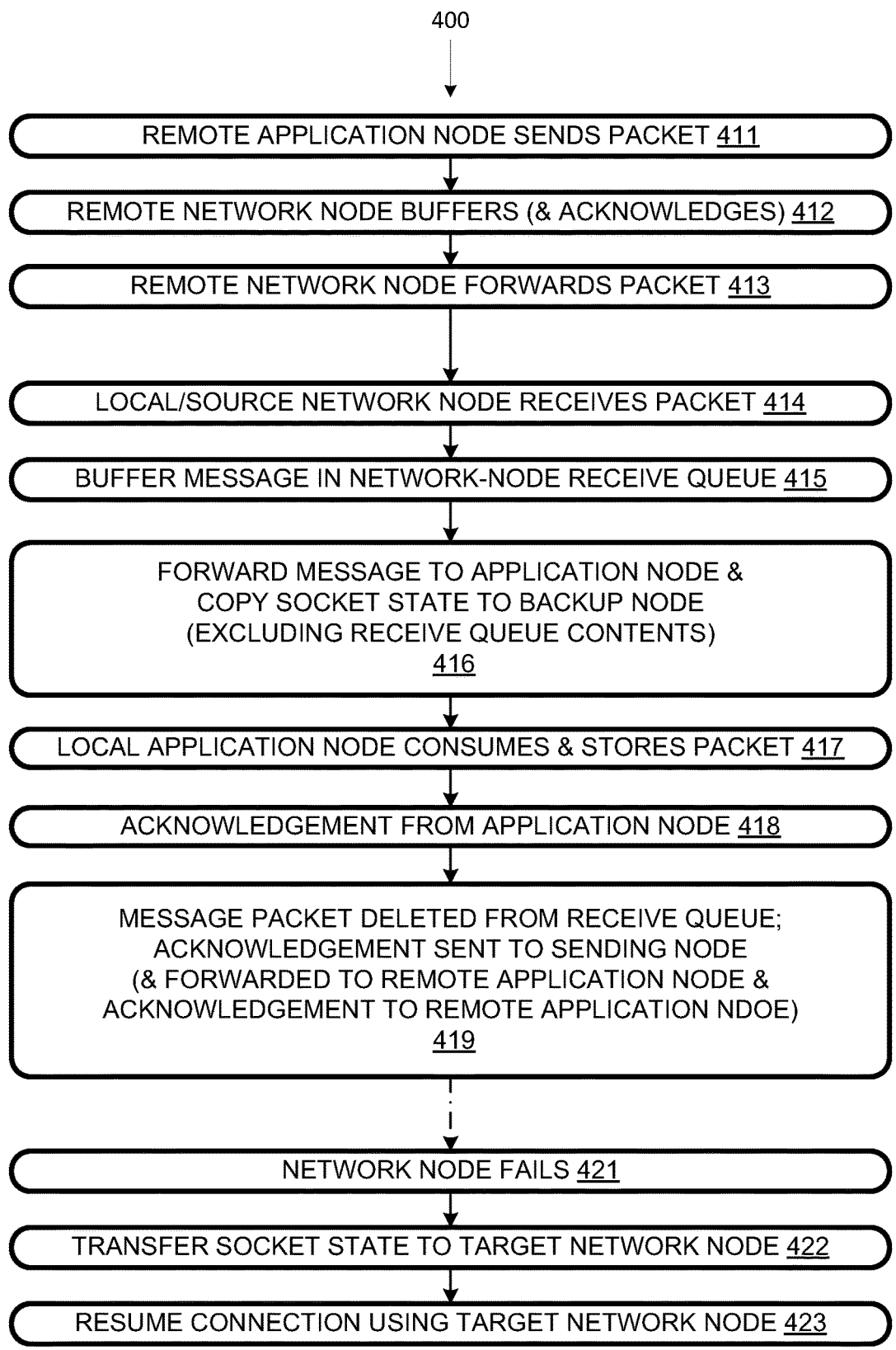
FIG. 4 is a flow chart of a process implementable in the context of the system of FIG. 3 in accordance with an example.

In accordance with an example, a local migration-source network node 100, shown in FIG. 1, holds off acknowledging a message packet received from a remote node until the destination migration-source application node acknowledges receipt of the message packet to the local network node. Thus, migration-source network node 100 implements a process 200, flow charted in FIG. 2.

Process 200 includes: at 201, receiving an inbound message packet via a connection with a remote node; at 202, in response, storing the message packet in a receive queue; at 203, in response, forwarding the inbound message packet to the local application node and sending socket-state data excluding buffered inbound messages to a backup node (which may be the same as the application node or the migration-target node, or may be another node); at 204, receiving an acknowledgement for the inbound message packet from the local application node; and, at 205, in response, sending an acknowledgement for the inbound message packet to the sending node. This latter acknowledgement is sent after its receipt by the application is acknowledged rather than at the conventional point, i.e., when the inbound message packet is originally received. Note that process 200 can be implemented by nodes other than network node 100.

So that it can implement process 200, network node 100 includes a processor 102, ports 104, and non-transitory storage media 106. Ports 104 may be used for communicating with a remote network node and a local application node. Media 106 is encoded with code 108 that includes executable code such as a network node operating system (NN-OS) 110, data structures for storing a socket state 112. The code further defines a receive queue 114 for buffering inbound message packets received from a remote network node, and a send queue 116 for buffering outbound message packets on route from a local application node to the remote network node. NN-OS 110 can be configured to, when executed by processor 102, implement process 200.

Waiting until an acknowledgement is received from the local application node before sending an acknowledgement to the remote network node causes the remote network node to retain the message packet in its queue. If the local socket is migrated to a migration-target network node, the remote network node may not receive an acknowledgement from the migration-source network node. In that case, the remote network node resends the message packet so the connection is preserved. This optimizes the processing and communications bandwidth requirements on all the network nodes involved.

If the local socket is migrated from a migration-source network node to a migration-target network node after an inbound message packet is sent but before it is acknowledged, the migration-source network node does not acknowledge the inbound message packet. In that case, the remote network node resends the packet, which is received by the migration-target network node. As a normal part of TCP, each packet contains a sequence number and the receiving network node discards packets with sequence numbers it has already received. The socket state transferred to the migration-target network node includes the last sequence number sent to the application node, so the migration-target network node can discard any duplicate packets.

The connection is preserved even though the receive-queue contents were not transferred from the migration-source network node to the migration-target network node. This results in reduced processing and bandwidth utilization even in the case of a planned migration involving only a single connection state transfer. As indicated above, in the example where the application node serves as the backup node, there is an additional reduction in processing and bandwidth utilization for the case where neither outbound nor inbound buffered messages are transferred by the source-migration node.

In many examples, the send queue is handled in a manner complementary to the handling of the receive queue. In other words, the local network node holds off acknowledgement of a send message packet until it receives an acknowledgement of the send message packet from a remote (network) node. In most cases, backup of the socket state can omit the contents of the send queue just as it omits the contents of the receive queue.

However, if the local network node and the local application node collectively represent a single point of failure, e.g., they are executing on the same hardware, then, in the event that single-point of failure failed, the local application node might not be available to is reseed lost send message packets. Therefore, in sonic examples, send queue contents are checkpointed, and only the receive contents are omitted from the socket state.

Note that it is an advantage of the processes disclosed herein that they can be implemented locally without any modifications or knowledge by the remote nodes. This is particularly useful where a user has control over local systems but not over the remote systems, e.g., which may be owned by another party or where this level of fault tolerance is required only for the local system.

A network system 300 includes a remote application node 302, a remote network node 304, a local network node 306, a local application node 308, and a migration-target network node 310. Local network node 306 includes a processor 312, ports 314, and non-transitory storage media 316. Media 316 is encoded with an executable network node operating system (NN-OS) 318, a data structure for storing socket state 320; the data structure includes a receive queue 322 and a send queue 324 (including their message-packet contents).

Local application node 308 includes a processor 332, ports 334, and media 336. Media 336 is encoded with code 338, which defines an application-node operating system (AN-OS) 340, an application 342, and backup socket state data 344. NN-OS 326 can be configured to, when executed by processor 312, implement a process 400. In an "inbound" scenario, at 411, a remote application node sends a message packet destined for a local application node. At 412, a remote network node receives the inbound message packet and buffers it in a receive queue.

While it can be implemented on one end of a connection without being implemented on the other, there is nothing preventing process 400 (or process 200, FIG. 2) from being implemented on some or all of the remote ends. In that case, the remote network, where implemented, does not acknowledge (to the remote application node) receipt of the message packet from the remote application node until an acknowledgement is received from the migration-source network node. In the more typical case, in which the process 400 is not implemented on the remote end, the remote network node may acknowledge receipt to the remote application node without waiting for an acknowledgement from the remote application node. At 413, the remote network node sends/forwards the inbound message packet to the local migration-source network node.

At 414, the migration-source node network node receives the message packet. At 415, the migration-source network node stores/buffers the message packet in its receive queue. In addition, the migration-source node updates its socket state at least to the extent that it tracks the packet number of the last received packet.

At 416, the migration-source network node forwards the ac message packet to the local application node. Also, the migration-source network node can copy the socket state to a backup node. If the migration-source network node is involved in more than one connection, each connection can have its own socket state. In that case, different socket states can be backed up to different backup nodes, e.g., for load-balancing purposes.

The backup node can be the migration-target network node (e.g., a standby network node or other network node to which a connection is to be migrated and on which the connection is to be resumed). However, it is also possible for the backup node and the migration-target network node to be different, in which case migration requires a second transfer of a connection state from the backup node to the migration-target node.

There can be more than one socket-state backup for a single connection. For example, in preparation for a failure of the application node, the application node may be backed up, e.g., check-pointed on a standby application node. Any socket state backups stored on the application node can be conveniently backed up a second time as the application node is backed up. If the active application node and the active network node both fail (e.g., they used the same hardware, which failed), the hardware for the standby application node can also support the migration-target network node. Alternatively, the socket state can be transferred from a newly activated standby application node to a migration-target network node. If additional redundancy is required this process may be used to implement triple redundancy.

At 417, the application node (or more specifically its application-node operating system AN-OS) stores the inbound message packet (which may also he consumed by the receiving application). At 418, the local application node acknowledges the inbound message packet and the migration-source network node receives the acknowledgement. At 419, the migration-source network node acknowledges the inbound message packet to the remote network node. If the remote network nodes implements process 400 (so that it did not acknowledge at 412), the remote network can forward the acknowledgment to the remote application node at 419.

In a scenario, the migration-source network node may fail, e.g., unexpectedly, at 421. In this scenario, the migration-source network node had established a connection with a remote network node on behalf of a local application node. The failure occurred while this connection was in use. In view of 416 above, the socket state for the migration-source network node has been checkpointed to the backup node.

In response to this failure, at 422, the application node or other backup node can transfer the socket state to a migration-target network node. This transfer may be omitted if the backup node is the migration-target network node. The socket state transferred can include TCP state data and the contents, or at least former contents, of the migration-source network node send queue (including message packets sent) for the failed network node. However, the transferred socket state excludes (does not include) contents of the migration-source network node receive queue. In other words, inbound message packets are not included in the transfer to the migration-target network node. At 423, the connection socket is resumed on the migration-target network node, thus completing the migration/failover.

In an "outbound" scenario for process 400, at 414, the migration-source network node receives an outbound message packet from the local application node. The migration-source network node does not acknowledge the send data until it receives a TCP acknowledgement from the remote network node. At 415, the migration-source network node buffers the outbound message packet in its send queue. At 416, the migration-source network node forwards the outbound message packet to the remote network node.

Depending on the example, the migration-source network node may or may not checkpoint the socket state in response to outbound message packets. In some examples, checkpointing is performed only in response to inbound message packets.

In the outbound scenario, at 418, an acknowledgement of the outbound message packet is received from the remote network node. At 419, the outbound message packet can be deleted from the send queue of the migration-source network node. Also, at 419, the acknowledgement can be sent to the application node and to the backup node so that the backup node can update the backup socket state. One acknowledgement can serve as an acknowledgement to both the application node and the backup node if the application node is the backup node.

As indicated above, a local application node can serve as the backup node. If the migration-source network node is handling plural connections concurrently for different local application nodes, each application node can serve as the backup node for the connections it uses.

On the other hand, if the local application node is likely to fail when the migration-source network node fails, e.g., they are executed using the same processor hardware or simply share is resources such as the same power supply, then the local application node is not a good candidate for a sole backup node. However, in that case, a second backup of the socket state can be implemented, e.g., from the network node to a second backup node, or in the course of checkpointing the application node.

Transfer of a socket state can be initiated either while the migration-source network node is active or inactive e.g., clue to failure). If the source node is active, the transfer can be initiated by a command that can specify a migration-target network node; for example, TCP connections can be migrated along with their endpoint applications, to prepare for maintenance of a component, to rebalance workloads in virtualized or cloud computing systems. Otherwise, a socket state can be transferred automatically (e.g., in response to a failure of the source network node) to a pre-configured migration-target network node, e.g., to route around a failing networking component. In the latter case, the socket state of the migration-source node can have been backed up on an ongoing basis to the migration-target network node or to an intermediate backup node.

Interruption due to the transfer can be minimized where the nodes involved in the transfer are connected by a high-speed low latency fabric (i.e., transport medium). The fabric can include an internal bus and/or a system-area network with direct memory access (DMA) to processor memory.

In other examples, the process is used to implement triple redundancy or even greater redundancy by adding multiple migration-target network nodes. Also, the process can be used to manually move workloads for the purpose of hardware or software upgrade. This process may be used to automatically move workloads for the purpose of resource optimization such as reduction of power requirements.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation, e.g., a physical transformation of storage media corresponding to a change of its contents.

Herein, "storage medium" and "storage media" refer to a system including non-transitory tangible material in or on which information is or can be encoded with information including instructions and non-instruction-type data. Herein, "processor" refers to hardware for executing instructions. A processor can be a monolithic device, e.g., integrated circuit, a portion of a device, e.g., core of a multi-core integrated circuit, or a distributed or collocated set of devices. Herein, "communications devices" refers to devices used for communication, including both network devices and devices used for input and output, e.g., human interface devices.

In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon, are within the scope of the following claims.

What is claimed is:

1. A system comprising non-transitory storage media encoded with code that, when executed by a first processor is caused to:
   in response to receiving inbound message packets via a connection with a remote node, buffer the received inbound message packets in a receive queue of a migration-source network node;
   forward the inbound message packets from the migration-source network node to an application node, and transfer socket states to a backup node other than the application node, the socket states excluding inbound message packets buffered in the receive queue; and
   in response to receiving from the application node acknowledgements corresponding to respective inbound message packets, send respective acknowledgements from the migration-source network node to the remote node.

2. The system as recited in claim 1 wherein the code:
   when executed by the first processor, is to, establish a TCP connection between the migration source network node and the remote node, the inbound message packets being communicated over the TCP connection, the TCP connection including a local socket on the migration-source network node, the socket states characterizing the local socket; and when executed by a second processor, is to resume the TCP connection on a migration-target network node.

3. The system as recited in claim 2 wherein the socket states transferred include outbound message packets.

4. The system as recited in claim 1 further comprising:
the first processor; and
ports to receive the TCP inbound message packets from the remote node, to forward inbound message packets to the application node, to communicate acknowledgements from the application node to the local network node and from the local network node to the remote node.

5. The system as recited in claim 1 further comprising said application node, the application node including non-transitory storage media encoded with code defining an application-node operating system that tracks a socket state of the migration-source network node.

6. The system as recited in claim 5 wherein the application-node operating system is to automatically transfer the socket state to a migration-target network node in response to a detection of a failure of the migration-source network node.

7. The system as recited in claim 1, wherein the socket state represents at least one of: an identity of the connection, a TCP state, a negotiated parameter, and a sequence number of a window size.

8. A process comprising:
receiving, by a migration-source network node, an inbound message packet from a remote node;
buffering the inbound message packet in a receive queue of the migration-source network node;
forwarding the inbound message packet to a local application node, and transferring a socket state exclusive of receive-queue contents to a backup node other than the local application node;
receiving an acknowledgement from the local application node; and in response to receiving the acknowledgement from the local application node, sending an acknowledgment to the remote node.

9. The process as recited in claim 8 further comprising prior to the receiving of the inbound message packet from the sending node, establishing a connection with the sending node, the connection including a socket having the socket state, wherein the receiving acknowledgement includes receiving an acknowledgement from the backup node of receipt of the socket state.

10. The process as recited in claim 9 wherein the backup node comprises a migration-target network node.

11. The process as recited in claim 9 further comprising:
transferring the socket state from the backup node to a migration-target network node; and
resuming the connection using a socket based on the transferred socket state.

12. The process as recited in claim 11 wherein the transferring the socket state from the backup node to the migration-target network node occurs automatically in response to a detection of a failure of the migration-source network node.

13. The process as recited in claim 11 wherein the transferring and resuming occur pursuant to a determination that doing so will favorably rebalance workloads.

14. A process as recited in claim 11, further comprising adding at least one additional migration-target network node to create a triple or greater redundancy.

15. The process as recited in claim 8, wherein the socket state is associated with a connection and the process further comprising:
migrating the connection to a migration-target network node, the backup node comprises the migration-target network node.

16. The process as recited in claim 8, wherein the socket state is associated with a connection and the process further comprising:
migrating the socket state to a migration-target network node, wherein migrating the connection comprises transferring the socket state from the backup node to the migration-target network node.

17. A process comprising:
receiving, by a migration-source network node, an inbound message packet from a remote node;
buffering the inbound message packet in a receive queue of the migration-source network node;
forwarding the inbound message packet to a local application node, and transferring a socket state exclusive of receive-queue contents to a backup node other than the local application node;
receiving an acknowledgement from the local application node;
in response to receiving the acknowledgement from the local application node, sending an acknowledgment to the remote node;
in response to a failure of the migration-source network node while it was managing a TCP connection for the local application node, transferring socket state data for the connection from the backup node to a migration-target network node; and
resuming the TCF connection on the migration-target network node.

18. The process as recited in claim 17 wherein the socket state data transferred includes contents of a send queue of the migration-source network node, and excludes contents of a receive queue of the migration-source network node.

* * * * *